(12) United States Patent
Radha B et al.

(10) Patent No.: US 11,989,238 B1
(45) Date of Patent: May 21, 2024

(54) TRUSTED NODE ELECTION FOR DATABASE CLUSTERS

(71) Applicant: Dell Products L.P., Round Rock, TX (US)

(72) Inventors: Jayashree Radha B, Bangalore (IN); Abhinash Kumar, Aurangabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/335,892

(22) Filed: Jun. 15, 2023

(51) Int. Cl.
*G06F 16/906* (2019.01)

(52) U.S. Cl.
CPC ................... *G06F 16/906* (2019.01)

(58) Field of Classification Search
CPC .... G06F 16/27; G06F 11/1464; G06F 16/285; G06F 11/2094; G06F 16/906
See application file for complete search history.

(56) References Cited

U.S. PATENT DOCUMENTS

| | | | |
|---|---|---|---|
| 9,984,140 B1* | 5/2018 | Sukumaran | G06F 16/27 |
| 2005/0132154 A1* | 6/2005 | Rao | G06F 11/1425 |
| | | | 709/201 |
| 2008/0140734 A1* | 6/2008 | Wagner | G06F 16/27 |

* cited by examiner

*Primary Examiner* — Hau H Hoang
(74) *Attorney, Agent, or Firm* — Chamberlain, Hrdlicka, White, Williams & Aughtry; Aly Z. Dossa

(57) ABSTRACT

A method for trusted node election. The method includes: identifying a database cluster implemented on a node subset of a plurality of nodes forming a data center; receiving node state from each node in the node subset; and electing, for the database cluster and from the node subset, a trusted node based on the node state from each node in the node subset and a database cluster type of the database cluster.

20 Claims, 8 Drawing Sheets

TRUSTED NODE ELECTION FOR DATABASE CLUSTERS

BACKGROUND

Concerning data management and/or protection purposes, it is important to maintain a consistent, holistic view of database cluster state for any database cluster(s) implemented throughout a data center. Currently, database cluster state is determined via reliance on information reported by each node participating in a given database cluster, where said information is scoped around the individual purview of the reporting node.

SUMMARY

In general, in one aspect, embodiments described herein relate to a method for trusted node election. The method includes: identifying a database cluster implemented on a node subset of a plurality of nodes forming a data center; receiving node state from each node in the node subset; and electing, for the database cluster and from the node subset, a trusted node based on the node state from each node in the node subset and a database cluster type of the database cluster.

In general, in one aspect, embodiments described herein relate to a non-transitory computer readable medium (CRM). The non-transitory CRM includes computer readable program code, which when executed by a computer processor, enables the computer processor to perform a method for trusted node election. The method includes: identifying a database cluster implemented on a node subset of a plurality of nodes forming a data center; receiving node state from each node in the node subset; and electing, for the database cluster and from the node subset, a trusted node based on the node state from each node in the node subset and a database cluster type of the database cluster.

In general, in one aspect, embodiments described herein relate to a system. The system includes: a data center including a plurality of nodes; and a data protection service operatively connected to the data center, and including a computer processor configured to perform a method for trusted node election. The method includes: identifying a database cluster implemented on a node subset of the plurality of nodes; receiving node state from each node in the node subset; and electing, for the database cluster and from the node subset, a trusted node based on the node state from each node in the node subset and a database cluster type of the database cluster.

Other aspects of the invention will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

DETAILED DESCRIPTION

Figure 1A:
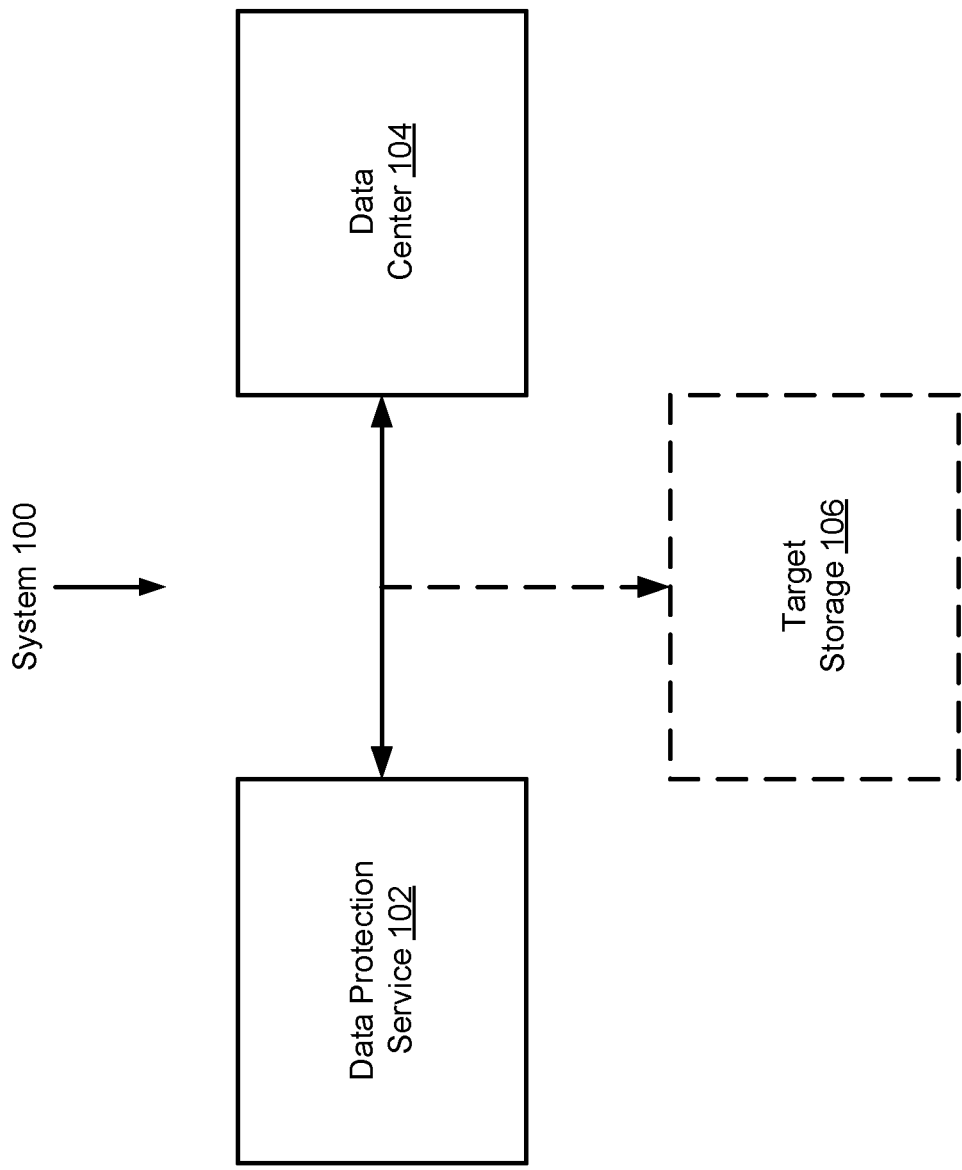
FIG. 1A shows a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to trusted node election for database clusters. Concerning data management and/or protection purposes, it is important to maintain a consistent, holistic view of database cluster state for any database cluster(s) implemented throughout a data center. Currently, database cluster state is determined via reliance on information reported by each node participating in a given database cluster, where said information is scoped around the individual purview of the reporting node. Various individual node views of the database cluster state thus undergo complex processing to attempt to build an accurate, holistic view of the database cluster state, which tends to be error prone. This often leads to incorrect database cluster state being available at any given time, thereby impacting the efficacy of data pertinent processes, such as data backup and/or recovery operations.

Embodiments described herein, accordingly, implement a solution addressing the above-mentioned issue(s) by way of trusted node election for database clusters. Particularly, the solution provides a mechanism through which a trusted node, from a group of nodes participating in any given database cluster, may be elected based, at least in part, on a database cluster type of the given database cluster. Said trusted node, once elected, may subsequently be relied upon to obtain trusted database cluster state that may be used to maintain a holistic view of the given database cluster, as well as to orchestrate, for example, data backup and/or recovery operations.

FIG. 1A shows a system in accordance with one or more embodiments described herein. The system (100) may include a data protection service (102), a data center (104) and, optionally, a target storage (106). Each of these system (100) components is described below.

In one or many embodiment(s) described herein, the data protection service (102) may represent any enterprise information technology (IT) infrastructure at least configured to orchestrate, and thus centralize, asset (e.g., database) discovery, protection, and governance. To that end, the data protection service (102) may include functionality to: interface with the data center (104) and/or the target storage (106) in order to perform trusted node elections (see e.g., FIG. 2), database cluster change notification processing (see e.g., FIG. 3), and cluster backup request processing (see e.g., FIG. 4). One of ordinary skill, however, will appreciate that the data protection service (102) may perform other functionalities without departing from the scope of the embodiments described herein.

In one or many embodiment(s) described herein, the data protection service (102) may be implemented through on-premises infrastructure, cloud computing infrastructure, or any hybrid infrastructure thereof. The data protection service (102), accordingly, may be implemented using one or more network servers (not shown), where each network server may represent a physical or a virtual network server. Additionally, or alternatively, the data protection service (102) may be implemented using one or more computing systems similar to the exemplary computing system illustrated and described with respect to FIG. 5, below. Moreover, the data protection service (102) is illustrated and described in further detail below with respect to FIG. 1B.

In one or many embodiment(s) described herein, the data center (104) may represent any privately owned and maintained enterprise IT environment. The data center (104) may include functionality to: encompass various networked resources (e.g., computer processors, memory, storage, virtualization, etc.), which may be allocated, as needed, to support any number of products and/or services offered locally or remotely over a network (not shown); and maintain any data generated, received, and/or employed by said offered products and/or services. One of ordinary skill, however, will appreciate that the data center (104) may perform other functionalities without departing from the scope of the embodiments described herein.

In one or many embodiment(s) described herein, the data center (104) may be implemented through on-premises infrastructure, cloud computing infrastructure, or any hybrid infrastructure thereof. The data center (104), accordingly, may be implemented using one or more network servers (not shown), where each network server may represent a physical or a virtual network server. Additionally, or alternatively, the data center (104) may be implemented using one or more computing systems similar to the exemplary computing system illustrated and described with respect to FIG. 5, below. Moreover, the data center (104) is illustrated and described in further detail below with respect to FIG. 1C.

In one or many embodiment(s) described herein, the target storage (106) may represent any data backup, archiving, and/or disaster recovery storage system. The target storage (106) may be implemented through on-premises infrastructure, cloud computing infrastructure, or any hybrid infrastructure thereof. The target storage (106), accordingly, may be implemented using one or more storage servers (not shown), where each storage server may represent a physical or a virtual storage server. Additionally, or alternatively, the target storage (106) may be implemented using one or more computing systems similar to the exemplary computing system illustrated and described with respect to FIG. 5, below.

In one or many embodiment(s) described herein, the storage server(s) of the target storage (106) may be supported by a collection of one or more physical storage devices (not shown) on which various forms of digital information—e.g., database copies (described below) (see e.g., FIG. 4)— may be maintained. Each physical storage device may encompass non-transitory computer readable storage media on which said digital information may be stored in whole or in part, and temporarily or permanently. Further, the physical storage device(s) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) described herein, the above-mentioned system (100) components (or subcomponents thereof) may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1A shows a configuration of components and/or subcomponents, other system (100) configurations may be used without departing from the scope of the embodiments described herein.

For example, in one or many other embodiment(s) described herein, the system (100) may further include a trusted node elector (not shown) operating as a standalone service—i.e., a standalone trusted node elector—that may operatively connect to the data protection service (102) and the data center (104), instead of operating as a subcomponent of the data protection service (102) as depicted and described with respect to FIG. 1B, below.

In said other embodiment(s), the standalone trusted node elector may represent any enterprise IT infrastructure at least configured to elect or otherwise determine a trusted node, from a subset of nodes forming the data center (104) (see e.g., FIG. 1C), for each database cluster implemented throughout the data center (104). To that end, the standalone trusted node elector may perform substantially the same functionalities of a trusted node elector that operates as a subcomponent of the data protection service (102) as illustrated/described in further detail below with respect to FIG. 1B.

In said other embodiment(s), the standalone trusted node elector may be implemented through on-premises infrastructure, cloud computing infrastructure, or any hybrid infrastructure thereof. The standalone trusted node elector, accordingly, may be implemented using one or more network servers (not shown), where each network server may represent a physical or a virtual network server. Additionally, or alternatively, the standalone trusted node elector may be implemented using one or more computing systems similar to the exemplary computing system illustrated and described with respect to FIG. 5, below.

Figure 1B:
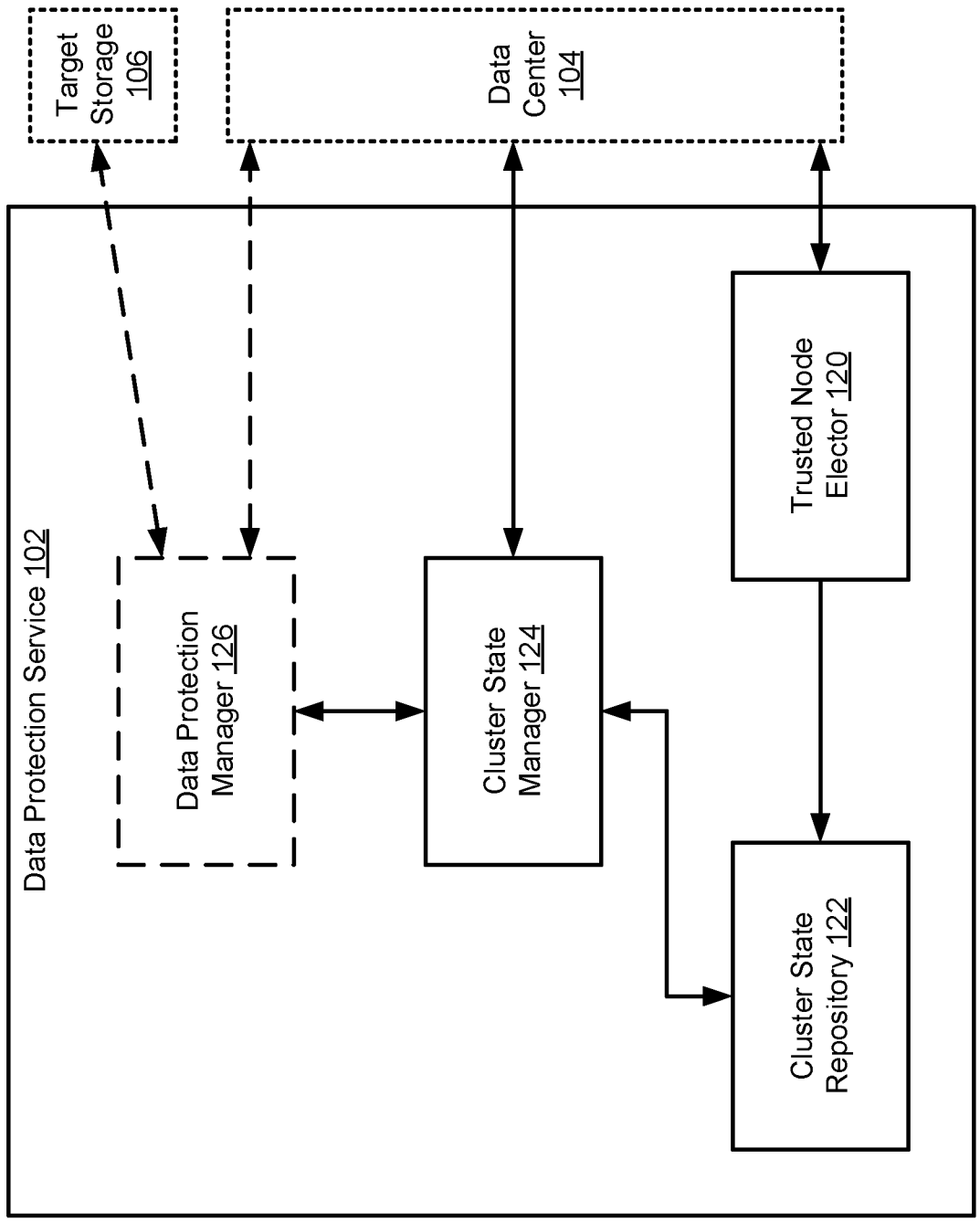
FIG. 1B shows a data protection service in accordance with one or more embodiments described herein.

FIG. 1B shows a data protection service in accordance with one or more embodiments described herein. The data protection service (102) may include a trusted node elector (120), a cluster state repository (122), a cluster state manager (124), and, optionally, a data protection manager (126). Each of these data protection service (102) components is described below.

In one or many embodiment(s) described herein, the trusted node elector (120) may refer to instruction-processing hardware (e.g., any number of integrated circuits for processing computer readable instructions), a computer program executing on the underlying hardware of the data protection service (102), or any combination thereof, at least configured to elect or otherwise determine a trusted node, from at least a subset of nodes forming the data center (104) (see e.g., FIG. 1C), for each database cluster implemented throughout the data center (104). To that end, the trusted node elector (120) may include functionality to: perform the method for trusted node election as illustrated and described with respect to FIG. 2, below. One of ordinary skill, however, will appreciate that the trusted node elector (120) may perform other functionalities without departing from the scope of the embodiments described herein.

In one or many embodiment(s) described herein, the cluster state repository (122) may refer to dedicated storage at least configured to maintain database cluster state pertaining to the database cluster(s) (see e.g., FIG. 1C) implemented throughout the data center (104). Any database cluster (not shown) may refer to a collection or group of database instances that may be hosted by at least a subset of the nodes forming the data center (104). Any database instance of a given database cluster, in turn, may refer to software (e.g., a computer program) at least configured to manage the storage and retrieval of, as well as access to, data in a database implemented either locally at each node on which a database instance of the given database cluster operates or shared virtually across the at least subset of nodes hosting the given database cluster. Further, whether the database may be implemented locally at each node, or shared virtually across the at least subset of nodes, hosting the database cluster may depend on a database cluster type of the database cluster with which the database may be associated. For example, if the database cluster type reflects a failover cluster instance (FCI) configuration, then the database may be shared as virtual storage across the at least subset of nodes hosting the database cluster. By way of another example, if the database cluster type reflects an always-on and available group (AAG) configuration, then a replica of the database may be maintained locally on each node in the at least subset of nodes hosting the database cluster.

In one or many embodiment(s) described herein, for each database cluster, the maintained database cluster state within the cluster state repository (122) may include, but may not be limited to: a database cluster identifier (ID) assigned to, and that uniquely identifies, the database cluster; a database cluster type (e.g., FCI, AAG, real application cluster (RAC), etc.) through which the database cluster may be configured; node metadata (e.g., network address, host name, status/state, etc.) associated with each node, in the at least subset of nodes of the data center (104), that hosts a database instance of the database cluster; a database instance ID assigned to, and that uniquely identifies, each database instance of the database cluster; a database cluster status indicating a current, holistic state (e.g., online/available, offline/unavailable, deleted, etc.) of the database cluster; and trusted node metadata (e.g., network address, host name, status/state, etc.) associated with a current, elected trusted node for the database cluster.

In one or many embodiment(s) described herein, the cluster state manager (124) may refer to instruction-processing hardware (e.g., any number of integrated circuits for processing computer readable instructions), a computer program executing on the underlying hardware of the data protection service (102), or any combination thereof, at least configured to gather trusted/trustworthy database cluster state for the database cluster(s) implemented throughout the data center (104) and maintain/manage said database cluster state in the cluster state repository (122). To that end, the cluster state manager (124) may include functionality to: perform the method for database cluster change notification processing as illustrated and described with respect to FIG. 3, below. One of ordinary skill, however, will appreciate that the cluster state manager (124) may perform other functionalities without departing from the scope of the embodiments described herein.

In one or many embodiment(s) described herein, the data protection manager (126) may refer to instruction-processing hardware (e.g., any number of integrated circuits for processing computer readable instructions), a computer program executing on the underlying hardware of the data protection service (102), or any combination thereof, at least configured to oversee and/or manage backup and restore operations targeting any granularity of data stored in any database corresponding to any database cluster(s) (see e.g., FIG. 1C) implemented throughout the data center (104). To that end, the data protection manager (126) include functionality to: perform the method for cluster backup request processing as illustrated and described with respect to FIG. 4, below. One of ordinary skill, however, will appreciate that the data protection manager (126) may perform other functionalities without departing from the scope of the embodiments described herein.

While FIG. 1B shows a configuration of components and/or subcomponents, other data protection service (102) configurations may be used without departing from the scope of the embodiments described herein.

For example, in one or many other embodiment(s) described herein, the data protection service (102) may exclude the trusted node elector (120), where the latter may operate external to the data protection service (102) as a standalone service—i.e., a standalone trusted node elector (not shown).

In said other embodiment(s), the standalone trusted node elector may represent any enterprise IT infrastructure at least configured to elect or otherwise determine a trusted node, from a subset of nodes forming the data center (104) (see e.g., FIG. 1C), for each database cluster implemented throughout the data center (104). To that end, the standalone trusted node elector may perform substantially the same functionalities of the trusted node elector (120) that operates as a subcomponent of the data protection service (102) as illustrated/described above with respect to FIG. 1B.

In said other embodiment(s), the standalone trusted node elector may be implemented through on-premises infrastructure, cloud computing infrastructure, or any hybrid infrastructure thereof. The standalone trusted node elector, accordingly, may be implemented using one or more network servers (not shown), where each network server may represent a physical or a virtual network server. Additionally, or alternatively, the standalone trusted node elector may be implemented using one or more computing systems similar to the exemplary computing system illustrated and described with respect to FIG. 5, below.

Figure 1C:
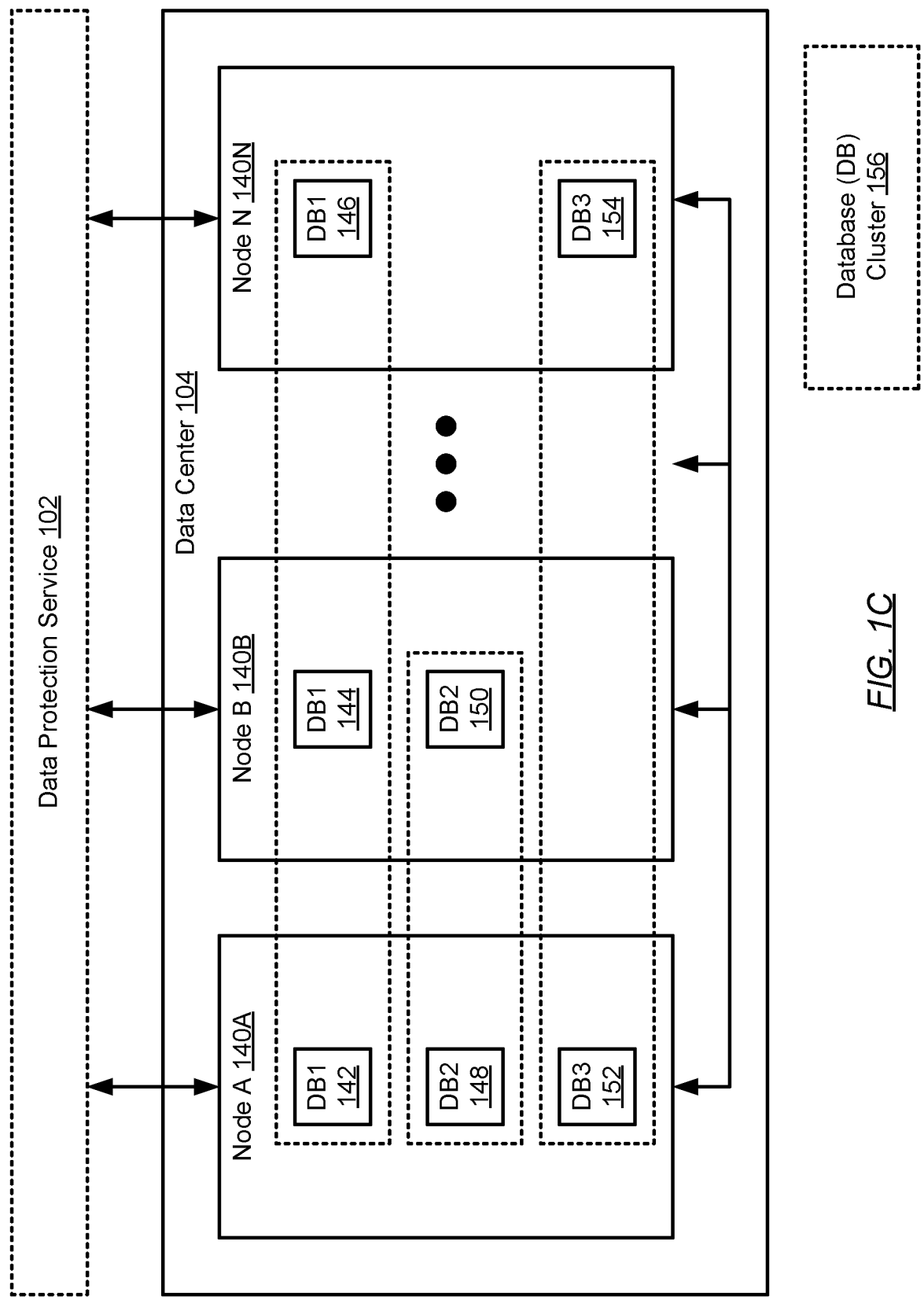
FIG. 1C shows a data center in accordance with one or more embodiments described herein.

FIG. 1C shows a data center in accordance with one or more embodiments described herein. The data center (104) may include two or more nodes (140A-140N), which are described below.

In one or many embodiment(s) described herein, any node (140A-140N) may refer to a physical network server, a virtual network server, or any computing system similar to the exemplary computing system illustrated and described below with respect to FIG. 5, at least configured to implement or host one or more database clusters (156). By way of a non-limiting example, three database clusters (156) (i.e., corresponding to databases DB1, DB2, and DB3) are depicted in FIG. 1C; however, one of ordinary skill will appreciate that a lesser or greater number of database cluster(s) may be implemented throughout the data center (104) without departing from the scope of the embodiments described herein.

In one or many embodiment(s) described herein, any database cluster (156) may refer to a collection or group of database instances (e.g., 142, 144, 146), which may be implemented or hosted across at least a subset of the nodes (140A-140N) forming the data center (104). Further, for a given database cluster (156), each database instance (e.g., 142, 144, 146) may refer to software (e.g., a computer program) at least configured to manage the storage and retrieval of, as well as access to, data in a database (e.g., DB1) corresponding to the given database cluster (156). The database (e.g., DB1), respective to a given database cluster (156) may be implemented locally as a database replica at each node on which a database instance (e.g., 142, 144, 146) of the given database cluster (156) operates, or may alternatively be implemented as virtual storage shared amongst the at least subset of the nodes (140A-140N), forming the data center (104), that may be hosting the given database cluster (156).

By way of non-limiting examples, FIG. 1C depicts: a group of three database instances (142, 144, 146) that form a first database cluster corresponding to a first database DB1; a group of two database instances (148, 150) that form a second database cluster corresponding to a second database DB2; and another group of two database instances (152, 154) that form a third database cluster corresponding to a third database DB3. The three database instances (142, 144, 146) of the first database cluster are hosted on Nodes A, B, and N (140A, 140B, 140N), respectively. The two database instances (148, 150) of the second database cluster are hosted on Nodes A and B (140A, 140B), respectively; and the two database instances (152, 154) of the third database cluster are hosted on Nodes A and N (140A, 140N), respectively.

In one or many embodiment(s) described herein, any given database cluster (156) may be configured based on, and thus may be associated with, a database cluster type—examples of which may include, but may not be limited to: a failover cluster instance (FCI) type/configuration, an always-on and available group (AAG) type/configuration, and a real application cluster (RAC) type/configuration. Furthermore, implementation of the database (e.g., DB1, DB2, or DB3), corresponding to a given database cluster (156), may be contingent on the database cluster type of the given database cluster (156).

For example, if the database cluster type reflects a FCI type/configuration, then the database (e.g., DB1) may be implemented as shared virtual storage pooled from at least a portion of the physical storage on each node participating in the implementation of the database cluster (156), where each database instance (e.g., 142, 144, 146) of the database cluster (156) may store and retrieve, as well as provide access to, any granularity of data in the shared virtual storage. By way of another example, if the database cluster type alternatively reflects an AAG type/configuration, then the database (e.g., DB2) may be implemented as separate (unshared, yet synchronization-capable) database replicas, where each database replica may be supported by at least a portion of the physical storage on a different node participating in the implementation of the database cluster (156), and where each database instance (e.g., 148, 150) of the database cluster (156) may store and retrieve, as well as provide access to, any granularity of data in the database replica respective to the node on which the database instance (e.g., 148, 150) is being hosted.

While FIG. 1C shows a configuration of components and/or subcomponents, other data center (104) configurations may be used without departing from the scope of the embodiments described herein.

Figure 2:
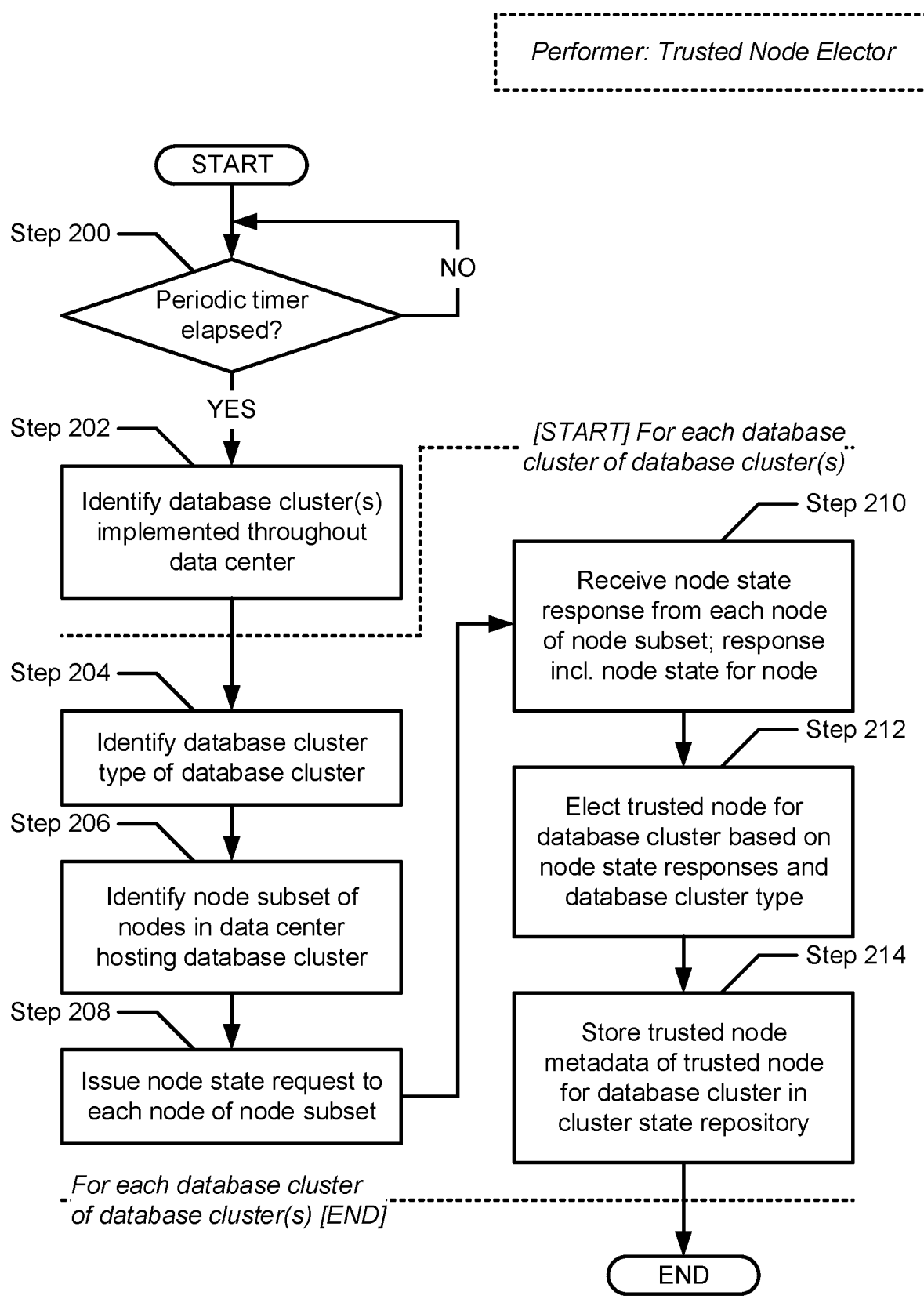
FIG. 2 shows a flowchart describing a method for trusted node election in accordance with one or more embodiments described herein.

FIG. 2 shows a flowchart describing a method for trusted node election in accordance with one or more embodiments described herein. The various steps outlined below may be performed by the trusted node elector of the data protection service (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a determination is made as to whether a periodic timer has elapsed. The periodic timer may refer to a time device (e.g., a hardware- or software-implemented clock) configured to measure a preset time interval, where the preset time interval corresponds to a periodicity at which a trusted node may be elected for each database cluster implemented throughout the data center (see e.g., FIG. 1C). The preset time interval may be dynamically configured by administrators of the data protection service and/or the data center. As such, in one or many embodiment(s) described herein, if it is determined that the periodic timer has elapsed, then the method proceeds to Step 202. On the other hand, in one or many other embodiment(s) described herein, if it is alternatively determined that the periodic timer has not elapsed, then the method reverts or remains at Step 200 until the periodic timer elapses.

In Step 202, following the determination (made in Step 200) that the periodic timer has elapsed, at least one database cluster is identified. In one or many embodiment(s) described herein, the at least one database cluster may be implemented throughout the data center (see e.g., FIG. 1C). Particularly, each identified database cluster may be implemented amongst at least a different or a same subset of the nodes forming the data center. Further, each identified database cluster may refer to, and thus encompass, a separate collection or group of database instances (described above) (see e.g., FIGS. 1B and/or 1C) and, further, may correspond to a separate database.

The remaining steps (i.e., Steps 204, 206, 208, 210, 212, and 214) presented and described hereinafter are pertinent to, and thus performed for, each database cluster of the at least one database cluster (identified in Step 202).

In Step 204, a database cluster type, of the database cluster, is identified. In one or many embodiment(s) described herein, the database cluster type may be stored in, and thus may be retrieved from, a data entry corresponding to the database cluster and maintained within the cluster state repository (see e.g., FIG. 1B). Examples of the database cluster type may include, but may not be limited to, a failover cluster instance (FCI) type/configuration, an always-on and available group (AAG) type/configuration, and a real application cluster (RAC) type/configuration.

In one or many embodiment(s) described herein, the database cluster type, further, may reference a schema through which the at least subset of data center nodes, participating in the implementation of the database cluster, may be configured. Said schema, for example, may reflect: the role (e.g., active or passive node in a FCI database cluster type, primary or secondary node in an AAG database cluster type, etc.) assigned to each node in the at least subset of data center nodes pertinent to the database cluster; and any rules governing role changes (e.g., a passive node becomes an active node in a FCI based database cluster when the previous active node fails) amongst the at least subset of data center nodes, pertinent to the database cluster, due to failover, scheduled node maintenance, and other events. Further, said schema is not limited to the aforementioned specific examples.

In Step 206, a node subset, of the nodes forming the data center, is identified. In one or many embodiment(s) described herein, the node subset may refer to at least two nodes each configured to host a database instance of the database cluster. Further, the node subset may be identified via node metadata stored in, and thus retrievable from, the data entry corresponding to the database cluster and maintained within the cluster state repository (see e.g., FIG. 1B). For a given node, examples of node metadata descriptive thereof may include: a network address assigned to the given node; a host name belonging to the given node; and a status/state reflective of the given node. Moreover, node metadata, for any node, is not limited to the aforementioned specific examples.

In Step 208, a node state request is issued to each node in the node subset (identified in Step 206). In one or many embodiment(s) described herein, the node state request may refer to a communication message asking the recipient (i.e., a node in the node subset) for current node state (described below) pertaining to the recipient.

In Step 210, a node state response is received from each node in the node subset (identified in Step 206) and in reply to the node state request (issued thereto in Step 208). In one or many embodiment(s) described herein, any node state response may refer to a communication message returning, and thus may include, current node state pertaining to the recipient (i.e., a node in the node subset) of the node state request. Further, the current node state may include the role (e.g., active or passive node in a FCI database cluster type, primary or secondary node in an AAG database cluster type, etc.) currently held by the recipient with respect to the database cluster type of the database cluster.

In Step 212, a trusted node, for the database cluster, is elected. In one or many embodiment(s) described herein, the trusted node may be elected from the node subset (identified in Step 206) based on the node state responses (received in Step 210) and the database cluster type (identified in Step 204). Particularly, provided the database cluster type associated with the database cluster, election of the trusted node for the database cluster may rely on the role currently held by each node in the node subset.

For example, in reference to a FCI based database cluster, a node subset pertinent to the database cluster may include at least one active node and at least one passive node. The active node(s) tend to conduct read and write operations targeting the database corresponding to the database cluster, whereas the passive node(s) tend to standby and take over the responsibilities of any failed active node(s). Accordingly, the node with the most up-to-date, and thus trusted or trustworthy, database cluster state falls to one of the active nodes, if not the active node, which is elected as the trusted node for the database cluster.

By way of another example, in reference to an AAG based database cluster, a node subset pertinent to the database cluster may include a single primary node and at least one secondary node. The primary node tends to conduct read and write operations targeting a primary database replica of the database corresponding to the database cluster, whereas any secondary node tends to conduct read-only operations targeting a respective secondary database replica of the database corresponding to the database cluster. Accordingly, the node with the most up-to-date, and thus trusted or trustworthy, database cluster state falls to the primary node, which is elected as the trusted node for the database cluster.

By way of yet another example, in reference to a RAC based database cluster, a node subset pertinent to the database cluster may include all active nodes. That is, each node in the node subset may be capable of conducting read and write operations targeting a shared database there-between corresponding to the database cluster. Accordingly, any one of the active nodes (i.e., any node in the node subset) may retain the most up-to-date, and thus trusted or trustworthy, database cluster state; and, subsequently, any one of said active nodes may be elected as the trusted node for the database cluster.

In Step 214, trusted node metadata, describing the trusted node (elected in Step 212) for the database cluster, is stored. In one or many embodiment(s) described herein, the trusted node metadata, for example, may include: a network address assigned to the trusted node; a host name belonging to the trusted node; and a status/state reflective of the trusted node. Further, the trusted node metadata is not limited to the aforementioned specific examples. Concerning the storage thereof, the trusted node metadata may be retained in a data entry corresponding to the database cluster and maintained within the cluster state repository (see e.g., FIG. 1B).

Figure 3:
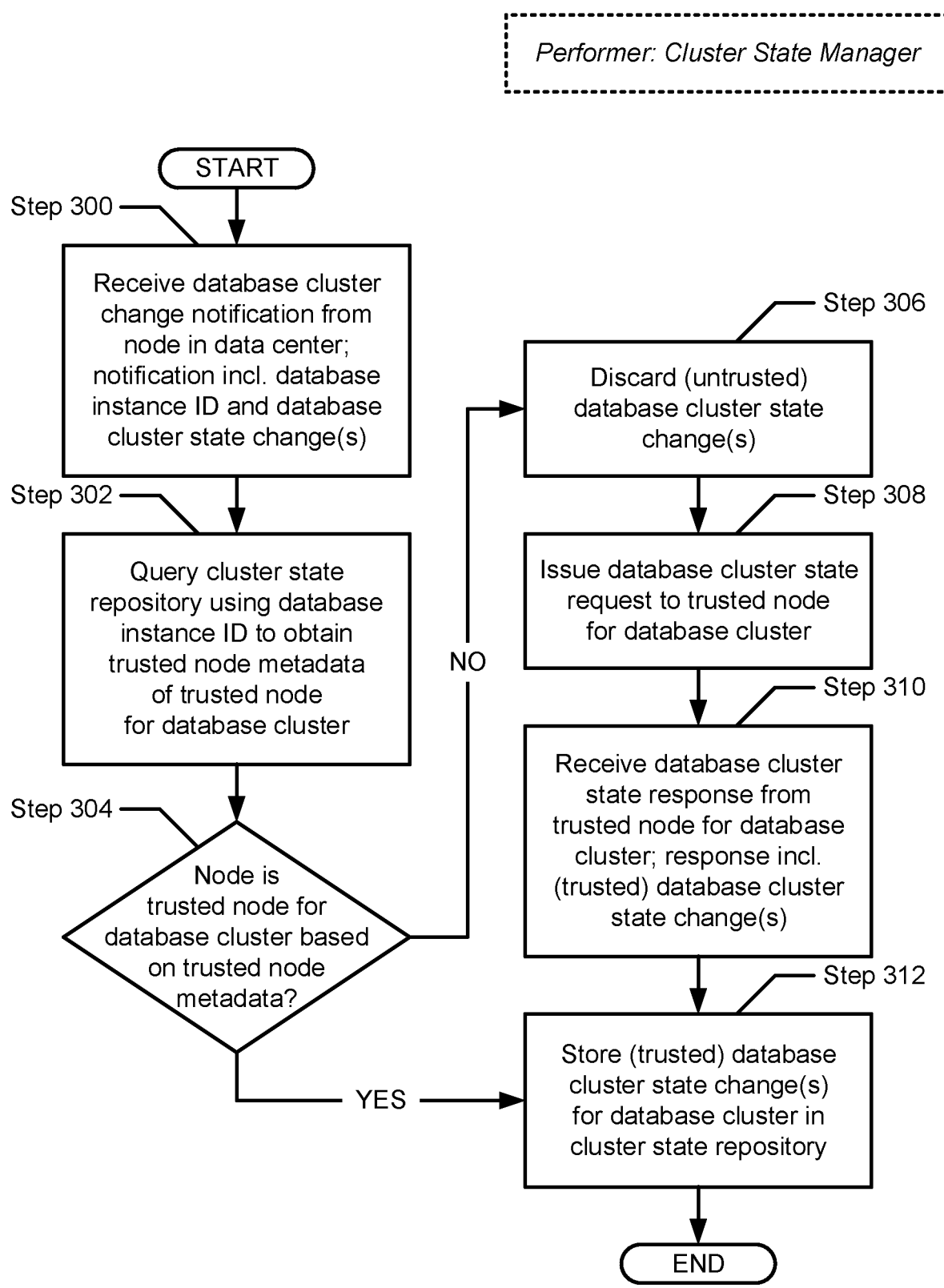
FIG. 3 shows a flowchart describing a method for database cluster change notification processing in accordance with one or more embodiments described herein.

FIG. 3 shows a flowchart describing a method for database cluster change notification processing in accordance with one or more embodiments described herein. The various steps outlined below may be performed by the cluster state manager of the data protection service (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a database cluster change notification is received from a node, at least in part, forming the data center (see e.g., FIG. 1C). In one or many embodiment(s) described herein, the database cluster change notification may refer to a communication message informing a recipient (i.e., cluster state manager) thereof of one or more database cluster state changes. The database cluster change notification, therefore, may include: a database instance ID assigned to, and thus uniquely identifying, a database instance of a database cluster implemented across at least a subset of the data center, where the node, from which the database cluster change notification had been received, hosts the database instance; and said database cluster state change(s), which may reflect, and thus be an extension of, any detected status change(s) (e.g., online/available, offline/unavailable, deleted, etc.) entailing the node, the database instance hosted on the node, and/or the database corresponding to the database cluster—all from the perspective of, and thus based on the role held by, the node in the database cluster. The database cluster change notification may additionally include, or may be received alongside, node metadata (e.g., network address, host name, etc.) associated with the node.

In Step 302, the cluster state repository, of the data protection service (see e.g., FIG. 1B), is queried using the database instance ID (received via the database cluster change notification in Step 300). Particularly, in one or many embodiment(s) described herein, a lookup may be performed across the cluster state repository using the database instance ID to identify a data entry therein corresponding to the database cluster and, thus, includes the database instance ID as one of at least two database instance IDs associated with at least two database instances, respectively, of the database cluster. The identified data entry, further, may also include trusted node metadata, descriptive of a trusted node for the database cluster, stored therein following a most recent election of the trusted node (see e.g., FIG. 2).

In Step 304, a determination is made as to whether the node (from which the database cluster change notification had been received in Step 300) is the trusted node for the database cluster. The determination may involve comparing the node metadata (received via or alongside the database cluster change notification in Step 300) against the trusted node metadata (obtained in Step 302). As such, in one or many embodiment(s) described herein, if it is determined that the node is not the trusted node for the database cluster (e.g., the node metadata mismatches the trusted node metadata), then the method proceeds to Step 306. On the other hand, in one or many other embodiment(s) described herein, if it is alternatively determined that the node is the trusted node for the database cluster (e.g., the node metadata matches the trusted node metadata), then the method alternatively proceeds to Step 312.

In Step 306, following the determination (made in Step 304) that the node (from which the database cluster change notification had been received in Step 300) is not the trusted node for the database cluster, the database cluster state change(s) (received via the database cluster change notification in Step 300) is deemed untrusted or untrustworthy and, subsequently, discarded.

In Step 308, a database cluster state request is issued to the trusted node (identified via the trusted node metadata obtained in Step 302) (or more specifically, to the database instance hosted thereon) for the database cluster. In one or many embodiment(s) described herein, the database cluster state request may refer to a communication message asking the recipient (i.e., the trusted node for the database cluster) for any change(s) in database cluster state from the perspective of the recipient. Recall that the trusted node, elected to represent the database cluster at any given point-in-time, tends to, for example, hold the role of an/the active node in a FCI based database cluster, the primary node in an AAG based database cluster, etc., and therefore retains the most up-to-date and accurate state (e.g., whether, comprehensively, the database cluster is online/available, offline/unavailable, deleted, etc.) concerning the database cluster. Accordingly, any database cluster state change(s), from the perspective of the trusted node, can be relied upon as trusted or trustworthy information that conveys an overall or holistic view of the current status, or change(s) thereof, describing the database cluster. Further, the database cluster state request may or may not include a database cluster ID assigned to, and thus uniquely identifying, the database cluster.

In Step 310, a database cluster state response, from the trusted node for the database cluster, is received in reply to the database cluster state request (issued thereto in Step 308). In one or many embodiment(s) described herein, the database cluster state response may refer to a communication message returning, and thus may include, database cluster state change(s) from the perspective of the recipient (i.e., the trusted node for the database cluster) of the database cluster state request. As elaborated above, any information (e.g., database cluster state and/or change(s) thereof) relayed from the trusted node for the database cluster may be deemed trusted or trustworthy as supported by the role of the trusted node with respect to the database cluster.

In Step 312, following the database cluster state response (received in Step 310) from the trusted node for the database cluster in reply to the database cluster state request (issued thereto in Step 308), or following the alternate determination (made in Step 304) that the node (from which the database cluster change notification had been received in Step 300) is the trusted node for the database cluster, the database cluster state change(s) (either received in Step 300 or Step 310) is/are deemed trusted/trustworthy and, subsequently, stored. Particularly, in one or many embodiment(s) described herein, the database cluster state change(s) may be maintained in the cluster state repository of the data protection service (see e.g., FIG. 1B); and, more specifically, within the data entry therein relative to the database cluster.

Figure 4:
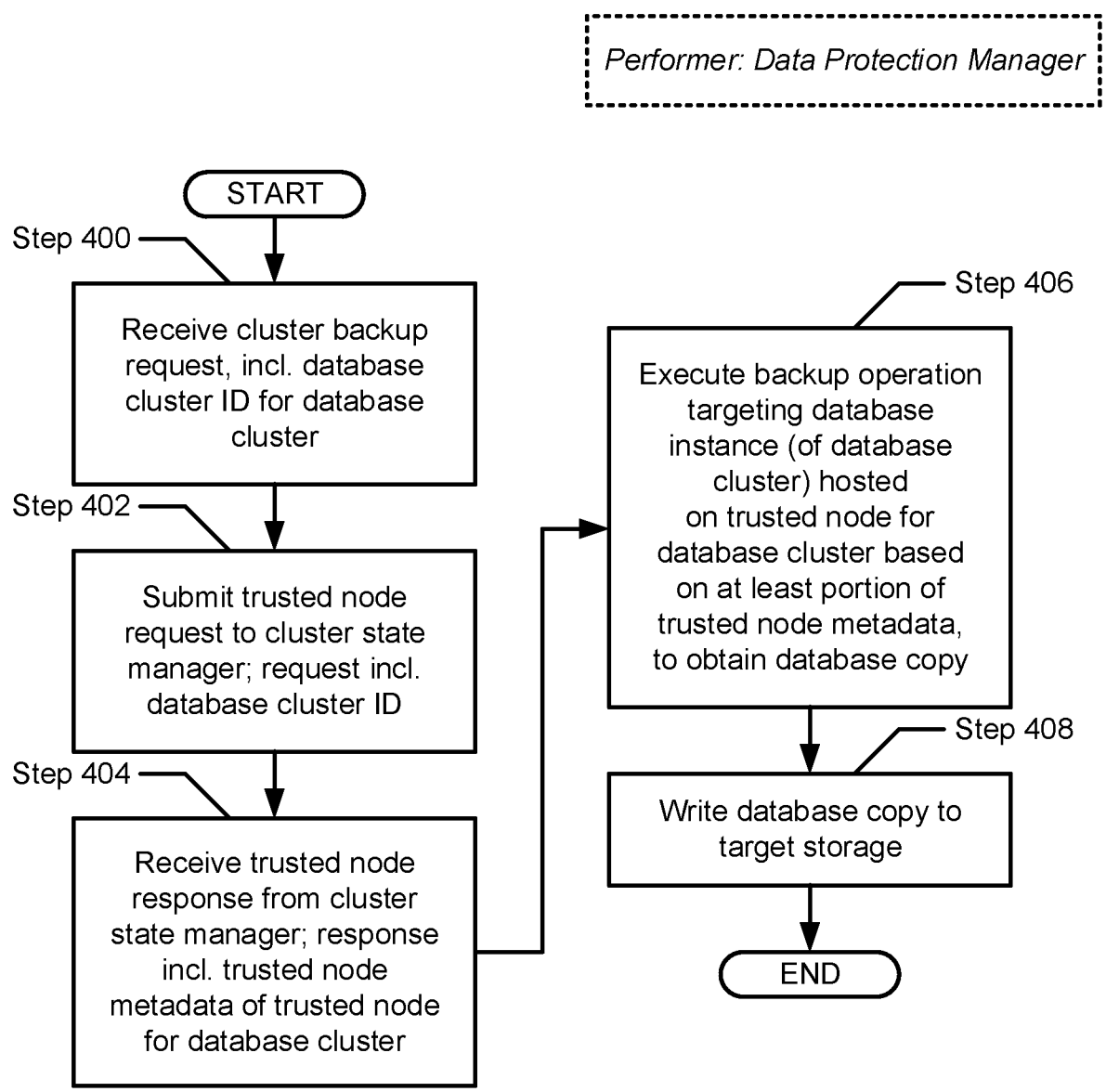
FIG. 4 shows a flowchart describing a method for cluster backup request processing in accordance with one or more embodiments described herein.

FIG. 4 shows a flowchart describing a method for cluster backup request processing in accordance with one or more embodiments described herein. The various steps outlined below may be performed by the data protection manager of the data protection service (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a cluster backup request is received. In one or many embodiment(s) described herein, the cluster backup request may refer to a communication message asking or instructing the recipient (i.e., the data protection manager) to perform a backup operation targeting the database corresponding to a specified database cluster. The cluster backup request, accordingly, may include a database cluster ID assigned to, and thus uniquely identifying, a target database cluster.

In Step 402, a trusted node request is submitted. In one or many embodiment(s) described herein, the trusted node request may be directed to the cluster state manager (see e.g., FIG. 1B) of the data protection service, and may refer to a communication message asking for information concerning the trusted node for the target database cluster. As such, the trusted node request may include the database cluster ID (received via the cluster backup request in Step 400).

In Step 404, a trusted node response is received in reply to the trusted node request (submitted in Step 402). In one or many embodiment(s) described herein, the trusted node response may be delivered by the cluster state manager, and may refer to a communication message returning, and thus may include, trusted node metadata (e.g., network address, host name, etc.) associated with the trusted node for the target database cluster. The cluster state manager may retrieve and provide said trusted node metadata by, for example, performing a lookup in the cluster state repository (see e.g., FIG. 1B) using the database cluster ID in order to identify a data entry therein respective to the target database cluster and, subsequently, obtaining said trusted node metadata that may be stored in the identified data entry.

In Step 406, a backup operation is executed. In one or many embodiment(s) described herein, the backup operation may target, or be directed to, the trusted node (or more specifically, the database instance operating/hosted thereon). The backup operation, further, may identify the trusted node and/or the database instance thereon based, at least in part, on the trusted node metadata (received via the trusted node response in Step 404). Moreover, execution of the backup operation may employ any existing full, incremental, or other backup creation technique(s) focusing on the backup of the database made accessible via the database instance and corresponding to the target database cluster. Execution of the backup operation may result in obtaining a database copy (e.g., all data if a full backup, data change(s) if an incremental backup, etc.) of the database corresponding to the target database cluster.

In Step 408, the database copy (obtained in Step 406) is written to, and thus stored in, target storage (see e.g., FIG. 1A), thereby fulfilling the cluster backup request (received in Step 400).

Figure 5:
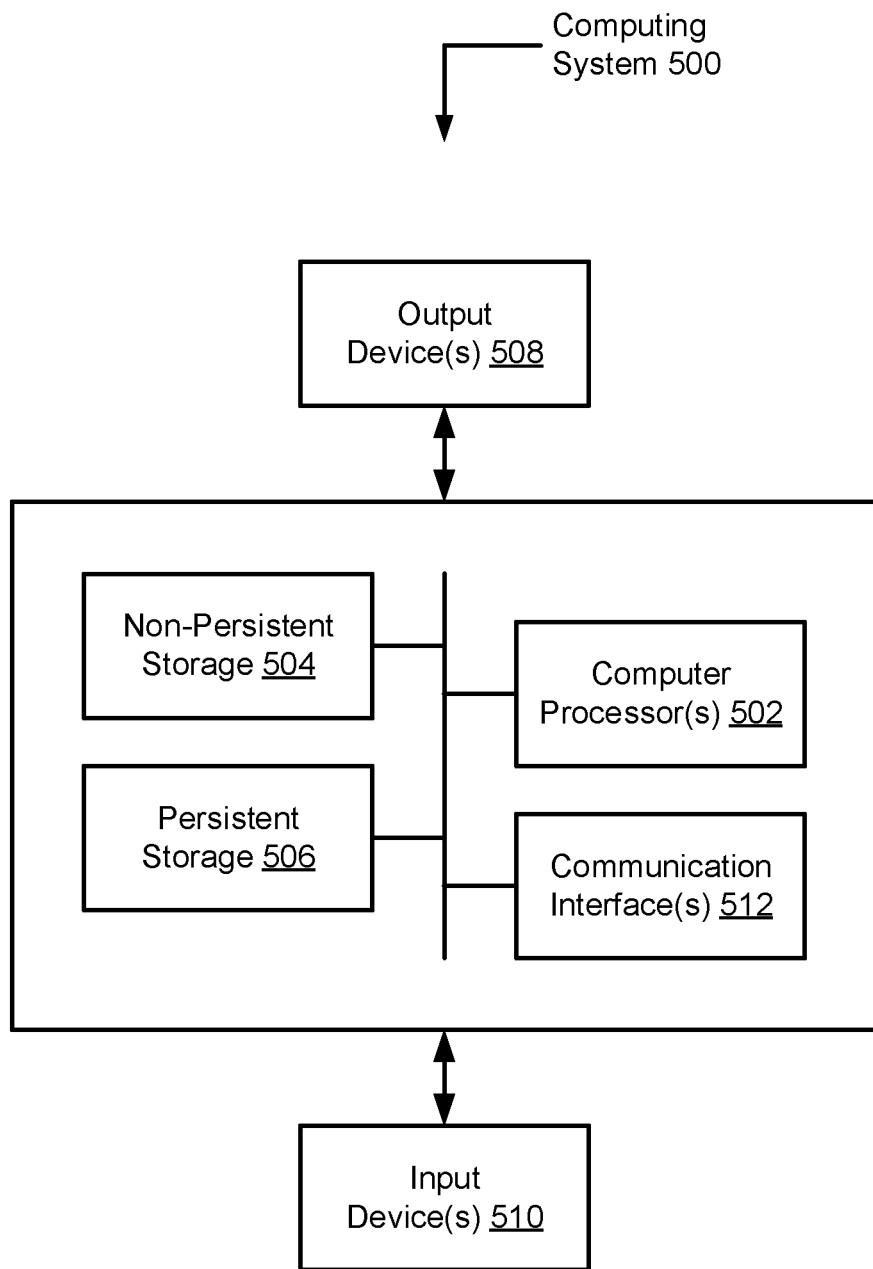
FIG. 5 shows a computing system in accordance with one or more embodiments described herein.

FIG. 5 shows a computing system in accordance with one or more embodiments described herein. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one or many embodiment(s) described herein, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one or many embodiment(s) described herein, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments described herein.

Figure 6:
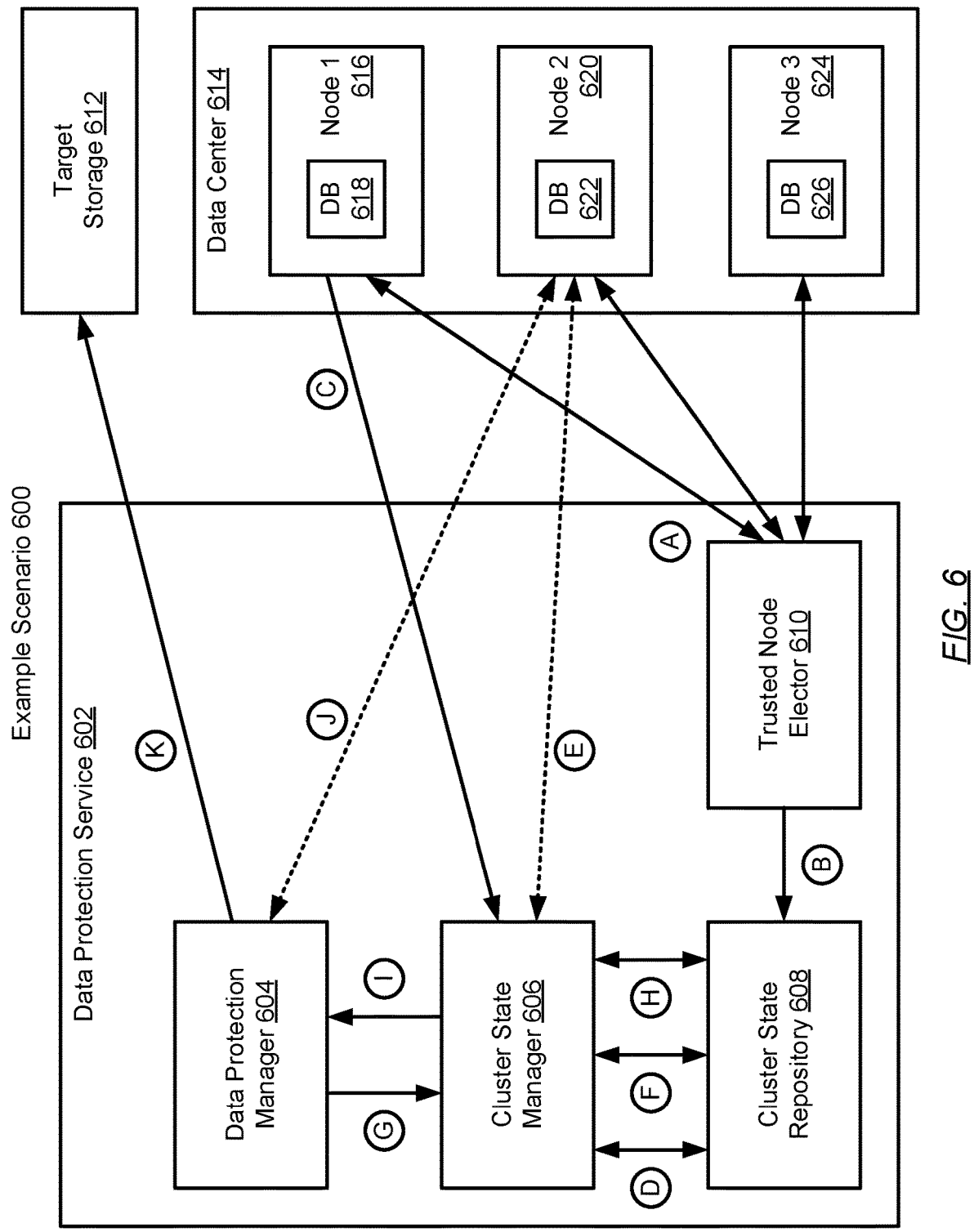
FIG. 6 shows an example scenario in accordance with one or more embodiments described herein.

FIG. 6 shows an example scenario in accordance with one or more embodiments described herein. The example scenario (600), illustrated through FIG. 6 and described below, is for explanatory purposes only and not intended to limit the scope of the embodiments described herein.

Turning to FIG. 6, consider the example scenario (600) where the data protection service (602) is tasked with the election of a trusted node for a database cluster implemented in the data center (614), where identification of the trusted node, further, drives the attainment of accurate database cluster state change(s) and the backup of the database, corresponding to the database cluster, from a trustworthy source (i.e., the trusted node). Conducting the aforementioned tasks, in accordance with one or many embodiment(s) described herein, may be implemented as follows:

Trusted Node Election
A. Trusted Node Elector (610) of Data Protection Service (602) issues a node state request to each Node (616, 620, 624) in Data Center (614) implementing the database cluster, where the database cluster is of a FCI database cluster type; each node state request, respective to a Node (616, 620, 624), asks for the current node state of the Node (616, 620, 624)— the current node state including the role that the Node (616, 620, 624) currently holds with respect to the database cluster; in reply, each Node (616, 620, 624) returns a node state response stating their respective database cluster role (e.g., Node 1 (616) is a passive node, Node 2 (620) is an active node, and Node 3 (624) is another passive node)
B. Trusted Node Elector (610) elects Node 2 (620) as the trusted node for the database cluster based on the received node state responses and the database cluster type (i.e., FCI) of the database cluster; thereafter, Trusted Node Elector (610) obtains trusted node metadata (e.g., network address, host name, etc.) associated with the elected trusted node and, subsequently, stores the obtained trusted node metadata in the Cluster State Repository (608) within a data entry respective to the database cluster Database Cluster Change Notification Processing
C. Cluster State Manager (606) of Data Protection Service (602) receives a database cluster change notification from Node 1 (616), where the database cluster change notification includes a database instance ID for a Database Instance 1 (618) hosted on Node 1 (616) and a database cluster state change (e.g., indicating the database cluster is offline/unavailable) from the perspective of Node 1 (616); the database cluster change notification also includes, or is received alongside, node metadata (e.g., network address, host name, etc.) pertaining to Node 1 (616)
D. Cluster State Manager (606) performs a lookup on the Cluster State Repository (608) using the database instance ID for Database Instance 1 (618), thereby identifying a data entry therein respective to the database cluster; from the identified data entry, Cluster State Manager (606) retrieves trusted node metadata (e.g., network address, host name, etc.) pertaining to the elected trusted node (i.e., Node 2 (620)) for the database cluster; Cluster State Manager (606) then compares the node metadata against the trusted node metadata, and verifies a mismatch there-between, which indicates that Node 1 (616) is not the trusted node for the database cluster; as a result of Node 1 (616) not being the trusted node for the database cluster, the received database cluster state change therefrom is deemed untrusted/untrustworthy and subsequently discarded
E. Cluster State Manager (606) issues database cluster state request to Node 2 (620) (i.e., the trusted node for the database cluster) (or, more specifically, to Database Instance 2 (622) hosted on Node 2 (620)), where the database cluster state request asks for the current database cluster state, or any change thereof, from the perspective of Node 2 (620), which is considered trusted/trustworthy information; in reply, Database Instance 2 (622) returns a database cluster state response indicating the current database cluster state (e.g., database cluster is online/available) for the database cluster from its perspective
F. Cluster State Manager (606) subsequently stores the current database cluster state (e.g., database cluster is online/available), received from Database Instance 2 (622) hosted on Node 2 (620) (i.e., the trusted node for the database cluster), in the Cluster State Repository (608) and, specifically, within the data entry therein respective to the database cluster Cluster Backup Request Processing
G. Data Protection Manager (604) of Data Protection Service (602) receives a cluster backup request instructing a backup operation, to be conducted, targeting the database corresponding to the database cluster, where the cluster backup request includes a database cluster ID for the database cluster; Data Protection Manager (604), accordingly, submits a trusted node request to the Cluster State Manager (606), where the trusted node request includes the database cluster ID
H. Cluster State Manager (606), using the database cluster ID, performs a lookup on the Cluster State Repository (608) to identify a data entry therein respective to the database cluster and, subsequently, retrieves trusted node metadata (e.g., network address, host name, etc.), associated with the trusted node (i.e., Node 2 (620)) for the database cluster, therefrom
I. Cluster State Manager (606) then provides the trusted node metadata to the Data Protection Manager (604) via a trusted node response
J. Data Protection Manager (604), based on the trusted node metadata (or at least a portion thereof), interfaces with Database Instance 2 (622) hosted on Node 2 (620) (i.e., the trusted node for the database cluster); through Database Instance 2 (622), the Data Protection Manager (604) accesses the database corresponding to the database cluster and commences the backup operation targeting the data maintained in the database, thereby obtaining a database copy of the database
K. Data Protection Manager (604) lastly writes the database copy into the Target Storage (612), thus completing the backup operation and fulfilling the received cluster backup request While the technology has been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for trusted node election, the method comprising:
    identifying a database cluster implemented on a node subset of a plurality of nodes forming a data center;
    receiving node state from each node in the node subset; and
    electing, for the database cluster and from the node subset, a trusted node based on the node state from each node in the node subset and a database cluster type of the database cluster.

2. The method of claim 1, wherein the node state, for a node in the node subset, comprises a role currently held by the node with respect to the database cluster.

3. The method of claim 2, wherein the database cluster type reflects a failover cluster instance (FCI) configuration, and wherein the role currently held by the trusted node is that of an active node in the node subset.

4. The method of claim 2, wherein the database cluster type reflects an always-on and available group (AAG)

configuration, and wherein the role currently held by the trusted node is that of a primary node in the node subset.

5. The method of claim 2, wherein the database cluster type reflects a real application cluster (RAC) configuration, and wherein the role currently held by the trusted node is that of the node in the node subset.

6. The method of claim 1, the method further comprising:
receiving, from a node in the node subset, a database cluster change notification comprising:
a database instance identifier (ID) for a database instance hosted on the node,
a database cluster state change concerning the database cluster, and
node metadata associated with the node;
obtaining, based on the database instance ID, trusted node metadata associated with the trusted node;
making a determination that the node is not the trusted node based on a mismatch between the node metadata and the trusted node metadata; and
discarding, based on the determination, the database cluster state change received from the node.

7. The method of claim 6, the method further comprising:
receiving, from a second database instance hosted on the trusted node and in reply to a database cluster state request issued thereto, a second database cluster state change concerning the database cluster; and
storing the second database cluster state change received from the trusted node.

8. The method of claim 1, the method further comprising:
receiving, from a node in the node subset, a database cluster change notification comprising:
a database instance identifier (ID) for a database instance hosted on the node,
a database cluster state change concerning the database cluster, and
node metadata associated with the node;
obtaining, based on the database instance ID, trusted node metadata associated with the trusted node;
making a determination that the node is the trusted node based on a match between the node metadata and the trusted node metadata; and
storing the database cluster state change received from the node.

9. The method of claim 1, the method further comprising:
receiving a cluster backup request comprising a database cluster identifier (ID) for the database cluster;
obtaining, based on the database cluster ID, trusted node metadata associated with the trusted node;
executing, based on the trusted node metadata, a backup operation targeting a database corresponding to the database cluster and using a database instance hosted on the trusted node, to obtain a database copy of the database; and
writing the database copy to target storage.

10. A non-transitory computer readable medium (CRM) comprising computer readable program code, which when executed by a computer processor, enables the computer processor to perform a method for trusted node election, the method comprising:
identifying a database cluster implemented on a node subset of a plurality of nodes forming a data center;
receiving node state from each node in the node subset; and
electing, for the database cluster and from the node subset, a trusted node based on the node state from each node in the node subset and a database cluster type of the database cluster.

11. The non-transitory CRM of claim 10, wherein the node state, for a node in the node subset, comprises a role currently held by the node with respect to the database cluster.

12. The non-transitory CRM of claim 11, wherein the database cluster type reflects a failover cluster instance (FCI) configuration, and wherein the role currently held by the trusted node is that of an active node in the node subset.

13. The non-transitory CRM of claim 11, wherein the database cluster type reflects an always-on and available group (AAG) configuration, and wherein the role currently held by the trusted node is that of a primary node in the node subset.

14. The non-transitory CRM of claim 11, wherein the database cluster type reflects a real application cluster (RAC) configuration, and wherein the role currently held by the trusted node is that of the node in the node subset.

15. The non-transitory CRM of claim 10, the method further comprising:
receiving, from a node in the node subset, a database cluster change notification comprising:
a database instance identifier (ID) for a database instance hosted on the node,
a database cluster state change concerning the database cluster, and
node metadata associated with the node;
obtaining, based on the database instance ID, trusted node metadata associated with the trusted node;
making a determination that the node is not the trusted node based on a mismatch between the node metadata and the trusted node metadata; and
discarding, based on the determination, the database cluster state change received from the node.

16. The non-transitory CRM of claim 15, the method further comprising:
receiving, from a second database instance hosted on the trusted node and in reply to a database cluster state request issued thereto, a second database cluster state change concerning the database cluster; and
storing the second database cluster state change received from the trusted node.

17. The non-transitory CRM of claim 10, the method further comprising:
receiving, from a node in the node subset, a database cluster change notification comprising:
a database instance identifier (ID) for a database instance hosted on the node,
a database cluster state change concerning the database cluster, and
node metadata associated with the node;
obtaining, based on the database instance ID, trusted node metadata associated with the trusted node;
making a determination that the node is the trusted node based on a match between the node metadata and the trusted node metadata; and
storing the database cluster state change received from the node.

18. The non-transitory CRM of claim 10, the method further comprising:
receiving a cluster backup request comprising a database cluster identifier (ID) for the database cluster;
obtaining, based on the database cluster ID, trusted node metadata associated with the trusted node;
executing, based on the trusted node metadata, a backup operation targeting a database corresponding to the database cluster and using a database instance hosted on the trusted node, to obtain a database copy of the database; and writing the database copy to target storage.

19. A system, the system comprising:

a data center comprising a plurality of nodes; and a data protection service operatively connected to the data center, and comprising a computer processor configured to perform a method for trusted node election, the method comprising:

identifying a database cluster implemented on a node subset of the plurality of nodes;

receiving node state from each node in the node subset; and electing, for the database cluster and from the node subset, a trusted node based on the node state from each node in the node subset and a database cluster type of the database cluster.

20. The system of claim 19, the system further comprising:

a target storage operatively connected to the data protection service, wherein the method further comprises:

receiving a cluster backup request comprising a database cluster identifier (ID) for the database cluster;

obtaining, based on the database cluster ID, trusted node metadata associated with the trusted node;

executing, based on the trusted node metadata, a backup operation targeting a database corresponding to the database cluster and using a database instance hosted on the trusted node, to obtain a database copy of the database; and writing the database copy to the target storage.

\* \* \* \* \*